(12) United States Patent
Zhou et al.

(10) Patent No.: US 10,984,831 B1
(45) Date of Patent: Apr. 20, 2021

(54) DATA STORAGE DEVICE COMPENSATING FOR SEEK VIBRATION USING VIBRATION SENSOR

(71) Applicant: Western Digital Technologies, Inc., San Jose, CA (US)

(72) Inventors: Jianguo Zhou, Foothill Ranch, CA (US); Li Zhou, San Jose, CA (US); Feng Hong, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/929,887

(22) Filed: Jul. 15, 2020

(51) Int. Cl.
*G11B 19/04* (2006.01)
*G11B 19/14* (2006.01)
*G11B 5/596* (2006.01)
*G11B 5/55* (2006.01)

(52) U.S. Cl.
CPC ............ *G11B 19/042* (2013.01); *G11B 5/556* (2013.01); *G11B 5/59622* (2013.01); *G11B 5/59633* (2013.01); *G11B 19/14* (2013.01)

(58) Field of Classification Search
None
See application file for complete search history.

(56) References Cited

U.S. PATENT DOCUMENTS

| | | | |
|---|---|---|---|
| 7,839,596 B2 | 11/2010 | Shen et al. | |
| 8,737,013 B2 | 5/2014 | Zhou et al. | |
| 8,737,014 B2* | 5/2014 | Massarotti | G11B 5/5582 360/97.19 |
| 8,922,938 B1 | 12/2014 | Chen et al. | |
| 8,937,784 B1 | 1/2015 | Liu et al. | |
| 9,013,825 B1* | 4/2015 | Chahwan | G11B 5/59694 360/75 |
| 9,058,827 B1* | 6/2015 | Tu | G11B 5/59694 |
| 9,111,575 B1* | 8/2015 | Zhou | G11B 19/28 |
| 9,202,496 B2* | 12/2015 | Supino | G11B 5/59622 |
| 9,269,386 B1 | 2/2016 | Xi et al. | |
| 9,460,744 B1* | 10/2016 | Gaub | G11B 5/59694 |
| 9,536,553 B1* | 1/2017 | Seo | G11B 5/5552 |
| 9,747,936 B1* | 8/2017 | Eklund | G11B 5/59622 |
| 10,410,657 B1 | 9/2019 | Zhou et al. | |
| 2003/0218819 A1 | 11/2003 | Sri-Jayantha et al. | |
| 2009/0034116 A1* | 2/2009 | Higashino | G11B 5/596 360/78.06 |
| 2010/0118425 A1* | 5/2010 | Rafaelof | G11B 19/042 360/31 |

* cited by examiner

*Primary Examiner* — Tan X Dinh (57) ABSTRACT

A data storage device is disclosed comprising an actuator configured to actuate a head over a disk surface, and a vibration sensor configured to generate a vibration signal (VS). Control circuitry comprising a servo control system having a torque rejection curve (TRC) configured to control the actuator is configured to measure a position error signal (PES) of the head, and measure the VS output by the vibration sensor. A feed-forward compensator is configured based on PES/VS/TRC. While seeking the head across the disk surface, the VS is processed using the feed-forward compensator to generate a feed-forward compensation during a settle interval of the seek, and the actuator is controlled using the feed-forward compensation during the settle interval.

15 Claims, 7 Drawing Sheets

FIG. 8C $$F(z) = \frac{b_0 + b_1 z^{-1} + b_2 z^{-2}}{1 + a_1 z^{-1} + a_2 z^{-2}}$$

DATA STORAGE DEVICE COMPENSATING FOR SEEK VIBRATION USING VIBRATION SENSOR

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
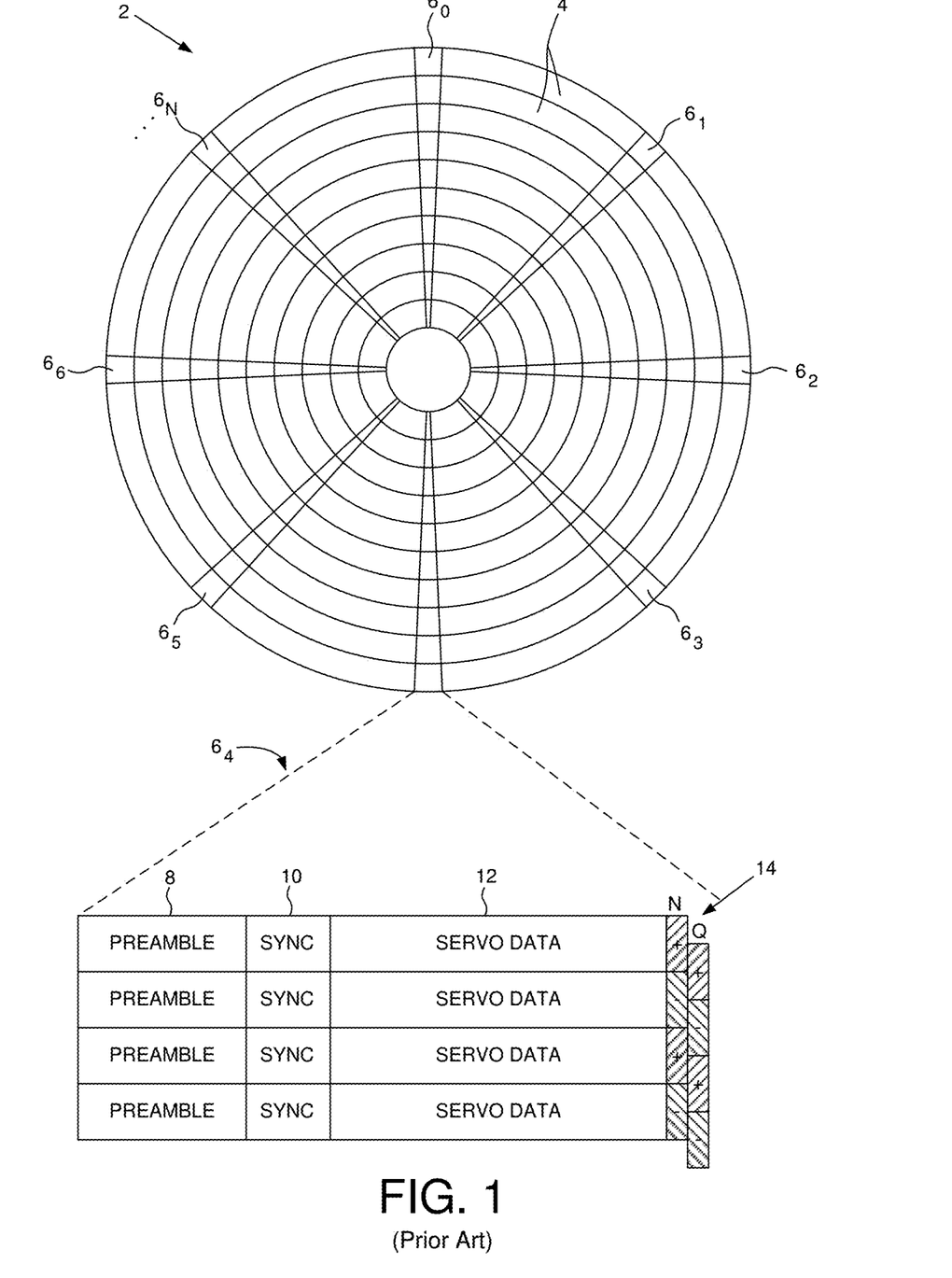
FIG. 1 shows a prior art disk format comprising a plurality of servo tracks defined by servo sectors.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figures 2A, 2B:
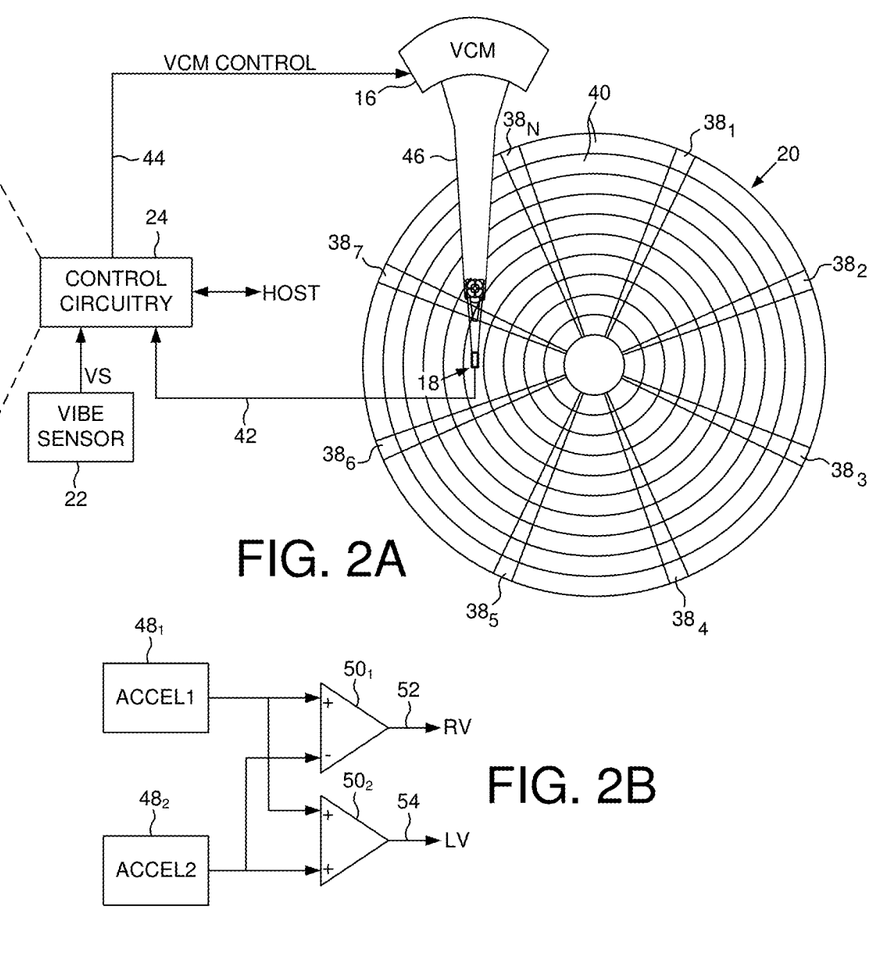
FIG. 2A shows a data storage device in the form of a disk drive according to an embodiment comprising a head actuated over a disk and a vibration sensor configured to sense a vibration affecting actuation of the head.
FIG. 2B shows an embodiment wherein the vibration sensor comprises a first and second accelerometer configured to generate a linear vibration (LV) signal and a rotational vibration (RV) signal.

FIG. 2A shows a data storage device in the form of a disk drive according to an embodiment comprising an actuator (e.g., VCM 16) configured to actuate a head 18 over a disk surface 20, and a vibration sensor 22 (e.g., as shown in FIG. 2B) configured to generate a vibration signal (VS). The disk drive further comprises control circuitry 24 comprising a servo control system having a torque rejection curve (TRC) configured to control the actuator 16, wherein the control circuitry 24 is configured to execute the flow diagram of FIG. 2C. A position error signal (PES) of the head is measured (block 26), the VS output by the vibration sensor is measured (block 28), and a feed-forward compensator is configured based on PES/VS/TRC (block 30). A seek operation is executed to seek the head across the disk surface (block 32), and the VS is processed using the feed-forward compensator to generate a feed-forward compensation during a settle interval of the seek (block 34), wherein the actuator controls the head using the feed-forward compensation during the settle interval (block 36).

In the embodiment of FIG. 2A, the disk surface 20 comprises a plurality of servo sectors $38_1$-$38_N$ that define a plurality of servo tracks, wherein the data tracks 40 are defined relative to the servo tracks at the same or different radial density. The control circuitry 24 processes a read signal 42 emanating from the head 18 to demodulate the servo sectors and generate a position error signal (PES) representing an error between the actual position of the head and a target position relative to a target track. A servo control system in the control circuitry 24 filters the PES using a suitable compensation filter to generate a control signal 44 applied to a VCM 16 which rotates an actuator arm 46 about a pivot in order to actuate the head radially over the disk surface in a direction that reduces the PES. In one embodiment, the head 18 may be actuated over the disk surface 20 based on the PES using one or more secondary actuators, for example, a microactuator that actuates a suspension coupling a head slider to the actuator arm 46, or a microactuator that actuates the head slider relative to a suspension (e.g., using a thermal actuator, piezoelectric actuator, etc.). The servo sectors $38_1$-$38_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 2C:
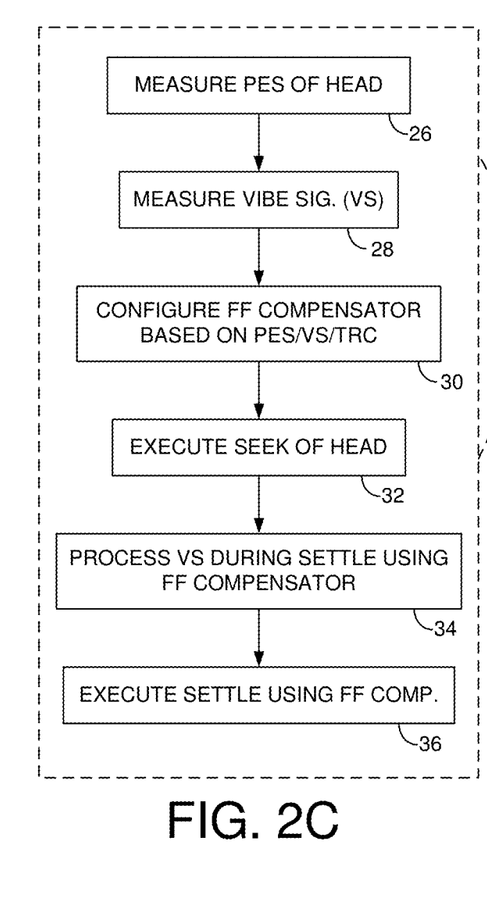
FIG. 2C is a flow diagram according to an embodiment wherein a feed-forward compensator is configured based on a measured position error signal (PES) of the head, a measured vibration signal (VS) generated by the vibration sensor, and a torque rejection curve (TRC) of a servo control system configured to control the head.

In one embodiment shown in FIG. 2C, the vibration sensor 22 comprises a first accelerometer $48_1$ and a second accelerometer $48_2$ mounted on a printed circuit board (PCB) of the disk drive. A first amplifier $50_1$ is configured to generate a rotational vibration (RV) signal 52 as the difference between the outputs of the accelerometers, and a second amplifier $50_2$ is configured to generate a linear vibration (LV) signal 54 as the sum of the outputs of the accelerometers. In one embodiment, the disturbance affecting the servo control system due to seeking the actuator arm 46 manifests predominately as a rotational vibration, and therefore in one embodiment a preconfigured feed-forward compensator processes the RV signal 52 in order to compensate for a seek vibration.

Figure 3:
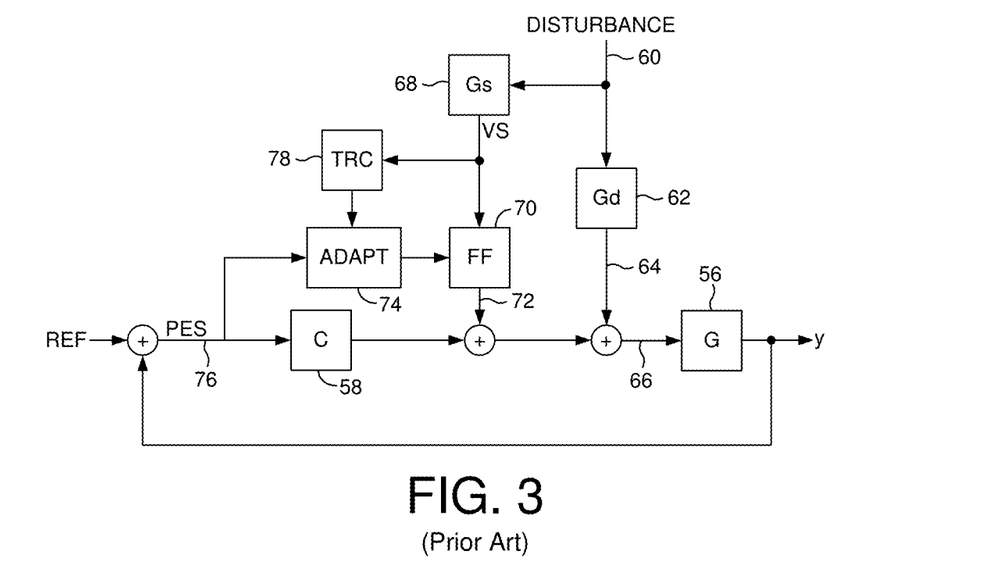
FIG. 3 shows a prior art servo control system comprising an adaptive feed-forward compensator.

Prior art servo control systems have employed an adaptive feed-forward compensator to compensate for either or both the LV or RV disturbances affecting the disk drive. FIG. 3 shows an example of a prior art servo control system wherein G 56 represents the transfer function of the actuator (e.g., the VCM 16) and C 58 represents any suitable feedback compensator. A vibration disturbance 60 affecting the disk drive, such as a vibration of a chassis mount or a seek vibration due to seeking the actuator arm 46, may translate (through transfer function Gd 62) into a control disturbance 64 added to the control signal 66 applied to the actuator 56. A transfer function Gs 68 represents the translation of the vibration disturbance 60 into the vibration signal (VS) output by the vibration sensor 22 (i.e., the transfer function of the vibration sensor mounted on the PCB). An adaptive feed-forward compensator FF 70 is configured to translate the vibration signal (VS) into a compensation signal 72 that effectively cancels the control disturbance 64. An adaptation block 74 processes the PES 76 and the vibration signal (VS) filtered by the TRC 78 of the servo control system in order to adapt the feed-forward compensator using any suitable adaptation algorithm. The adaptation block 74 may implement any suitable adaptation algorithm, such as the adaptation algorithms disclosed in U.S. Pat. No. 8,737,013 entitled "DISK DRIVE SELECTING DISTURBANCE SIGNAL FOR FEED-FORWARD COMPENSATION" and U.S. Pat. No. 9,058,827 entitled "DISK DRIVE OPTIMIZING FILTERS BASED ON SENSOR SIGNAL AND DISTURBANCE SIGNAL FOR ADAPTIVE FEED-FORWARD COMPENSATION," the disclosures of which are herein incorporated by referenced.

Although the adaptive feed-forward compensator FF 70 in the prior art servo control system of FIG. 3 may help compensate for a seek vibration due to seeking the actuator arm 46, there may be a lag in the compensation efficacy due to the convergence delay of the adaptation block 74. This delay in efficacy may be exacerbated if the feed-forward compensator 70 has drifted to a state (e.g., a low vibration state) that requires significant adaptation in order to converge to a state that is capable of compensating for an intermittent seek vibration. Accordingly in one embodiment, a feed-forward compensator may be preconfigured to provide a near immediate compensation for a vibration seek, thereby avoiding the convergence delay of an adaptive feed-forward compensator. In an embodiment described below, a first feed-forward compensator may be preconfigured to compensate for a seek vibration, and a second feed-forward compensator may be adapted in real time to compensate for any residual (or other) vibrations affecting the servo control system.

Figure 4:
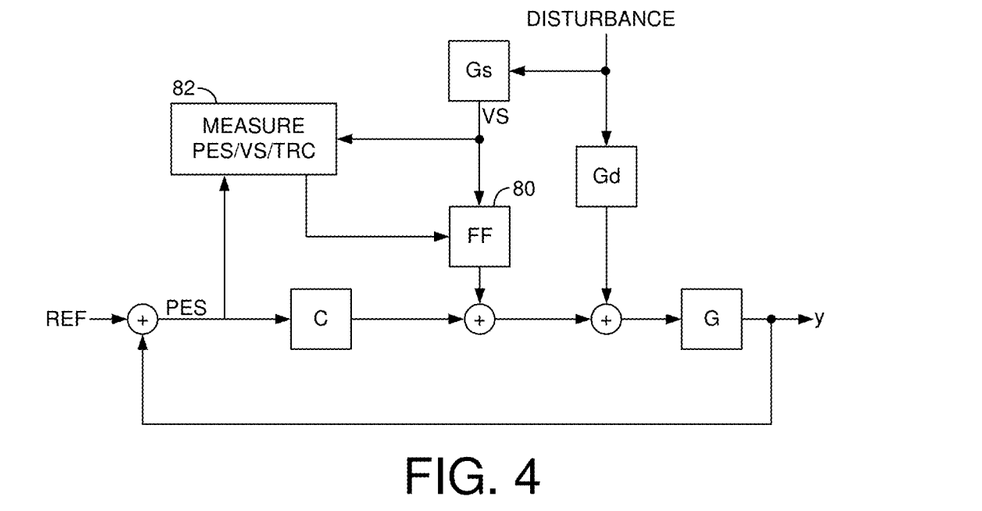
FIG. 4 shows a servo control system according to an embodiment wherein a feed-forward controller is calibrated based on the PES and VS measured during a calibration seek.

FIG. 4 shows an embodiment of a feed-forward compensator FF 80 that is preconfigured to compensate for a seek vibration affecting the servo control system. In this embodiment, a transfer function of the feed-forward compensator FF 80 is configured by block 82 to substantially match the transfer function:

PES/VS/TRC where the PES and VS are measured while performing a calibration seek of the actuator arm 46, and the TRC of the servo control system may be measured using any suitable technique known in the art. That is, in one embodiment the control circuitry 24 may execute a number of calibration seeks, wherein during each seek the PES and VS may be measured (in the frequency domain) in order to generate (and update) the above transfer function which effectively estimates the transfer function –Gd/Gs so as to cancel the vibration disturbance 64 from the control signal 66. Once the transfer function has been measured based on the calibration seeks, the feed-forward compensator 80 may be preconfigured with the transfer function prior to executing a seek during normal operation, thereby providing near instant compensation of the seek vibration (as compared to the convergence delay of a real time adaptive feed-forward compensator).

Figure 5:
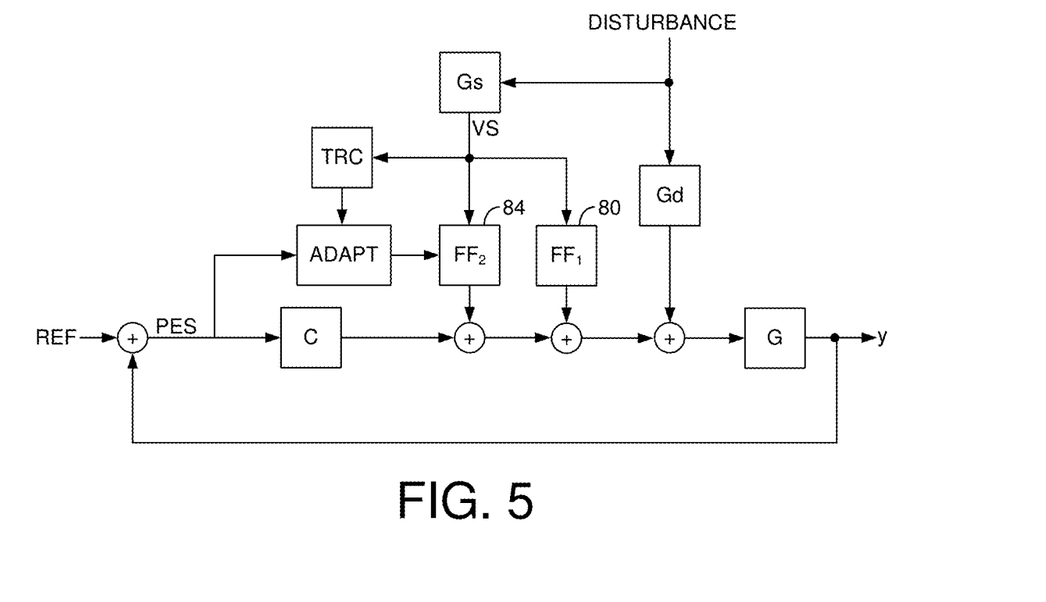
FIG. 5 shows a servo control system according to an embodiment comprising a preconfigured feed-forward compensator calibrated to compensate for a disturbance caused by seeking an actuator, and an adaptive feed-forward compensator adapted to compensate for residual vibrations affecting the data storage device.

FIG. 5 shows a servo control system according to an embodiment wherein a preconfigured feed-forward compensator 80 provides near instant compensation for a seek vibration, and an adaptive feed-forward compensator 84 provides additional vibration compensation (e.g., due to an external vibration affecting the disk drive) as well as residual compensation for the seek vibration (i.e., compensate for any mismatch between the preconfigured feed-forward compensator 80 and the seek vibration). In one embodiment, compensating for the seek vibration using a preconfigured feed-forward compensator 80 increases the efficacy and/or reduces the required complexity of the adaptive feed-forward compensator 84. For example, in one embodiment the preconfigured feed-forward compensator 80 may reduce the convergence delay of the adaptive algorithm and/or reduce the required number of filter taps of the adaptive feed-forward compensator 84.

Figure 6:
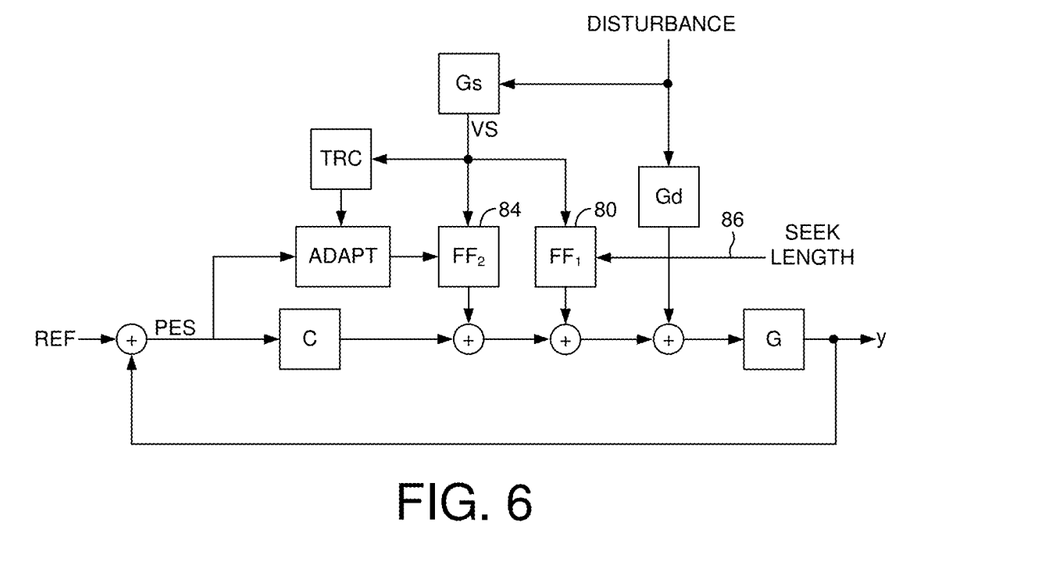
FIG. 6 shows a servo control system according to an embodiment wherein the preconfigured feed-forward compensator is configured based on a seek length of the actuator.
Figure 7A:
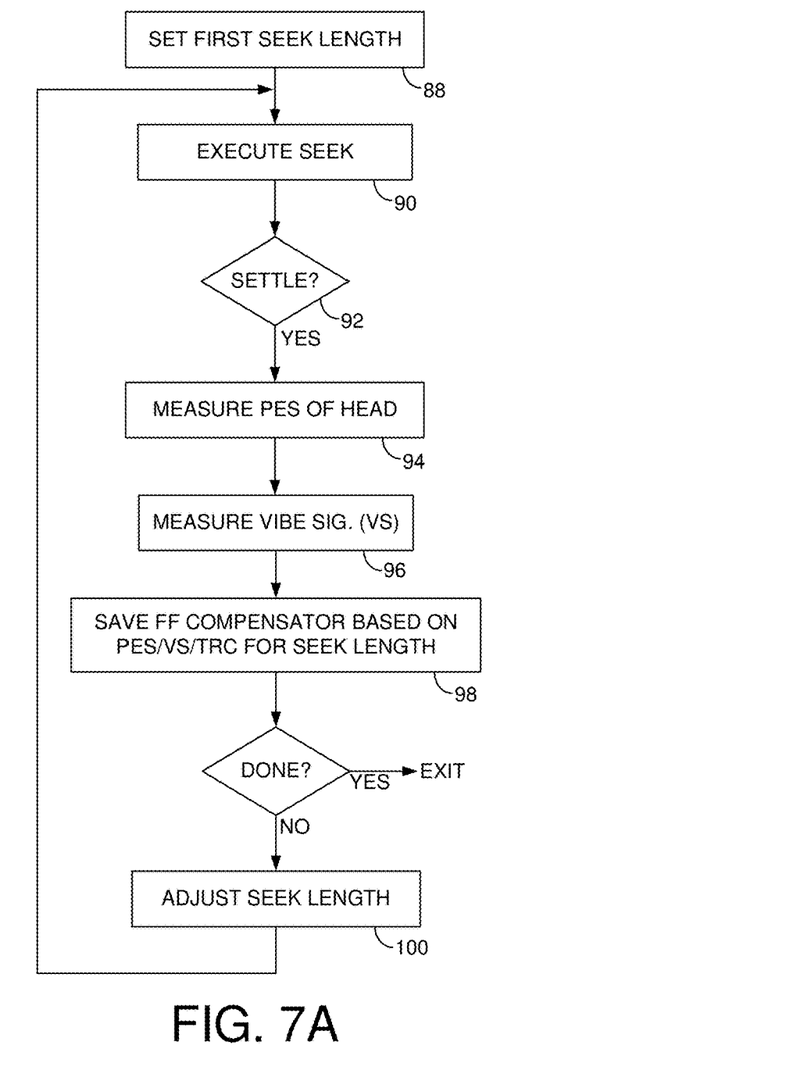
FIG. 7A is a flow diagram according to an embodiment wherein a feed-forward compensator is calibrated based on the transfer function PES/VS/TRC measured for a number of different seek lengths.
Figure 7B:
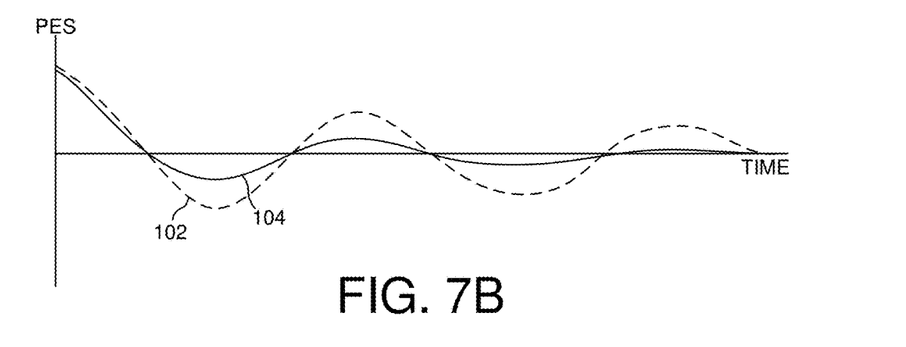
FIG. 7B shows an example seek settle of the actuator without and with the preconfigured feed-forward compensator.

FIG. 6 shows an embodiment wherein the preconfigured feed-forward compensator 80 may be calibrated for a number of different seek lengths, and then during normal operation the feed-forward compensator 80 may be configured based on the seek length 86 of a normal seek operation. An example of this embodiment is understood with reference to the flow diagram of FIG. 7A wherein during a calibration procedure a first seek length is configured for the actuator arm (block 88) and the corresponding seek executed (block 90). When the seek operation transitions into a settle mode (block 92) in order to settle the head onto the target track, the measured PES (block 94) and the measured VS (block 96) are processed as described above to generate and save the corresponding transfer function for the preconfigured feed-forward compensator (block 98). In one embodiment, the calibration seek for the current seek length may be executed a number of times and the transfer function updated until the transfer function converges within an acceptable tolerance. After generating and saving the transfer function for the current seek length, the seek length is adjusted (block 100) and the flow diagram repeated from block 90 in order to generate and save the transfer function for the different seek length. This process is repeated for a number of different seek lengths, for example, for a short seek length, a medium seek length, and a long seek length. During normal operation of the disk drive, prior to executing a seek operation of a known seek length the feed-forward compensator 80 is preconfigured using the transfer function that corresponds to the seek length 86 as shown in FIG. 6. FIG. 7B illustrates the benefit of the preconfigured feed-forward compensator 80 by evaluating the PES 102 during the settle interval of a seek without using the preconfigured feed-forward compensator 80 as compared to the reduction of the PES 104 and corresponding settle interval when using the preconfigured feed-forward compensator 80.

Figure 8A:
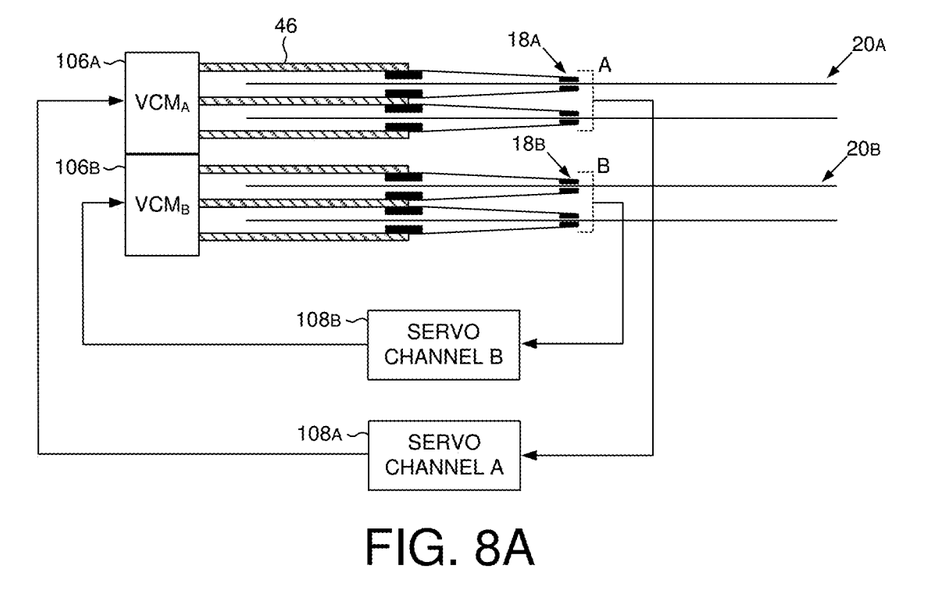
FIG. 8A shows an embodiment wherein the data storage device comprises a first actuator configured to actuate a first number of heads over respective disk surfaces, and a second actuator configured to actuate a second number of heads over respective disk surfaces.

In one embodiment shown in FIG. 8A, the disk drive may comprise a split actuator configuration wherein a first VCM 106A is configured to actuate a first subset of heads over first disk surfaces (e.g., head 18A over disk surface 20A), and a second VCM 106B is configured to actuate a second subset of heads over second disk surfaces (e.g., head 18B over disk surface 20B). In this embodiment, a first servo channel 108A comprises a suitable servo control system for controlling the first VCM 106A, and a second servo channel 108B comprises a suitable servo control system for controlling the second VCM 106B. Also in this embodiment, the actuator arms 46 for actuating each subset of heads are rotated about a common pivot, whereas in other embodiments the actuator arms may be rotated about independent pivots. For example, in one embodiment two or more actuator assemblies (VCM and actuator arms) may be mounted at different circumferential locations about the disks (e.g., offset by 180 degrees). Regardless as to how the actuators are configured about the disks, in one embodiment when the first actuator 106A is executing a tracking operation during an access operation (e.g., write or read) and the second actuator 106B executes a seek operation, there is a resulting seek vibration that impacts the performance of the tracking operation of the first actuator 106A. That is, in one embodiment the seek vibration compensated by the preconfigured feed-forward compensator 80 as described above may be a seek vibration induced by seeking a second actuator when tracking a first actuator.

Figure 8B:
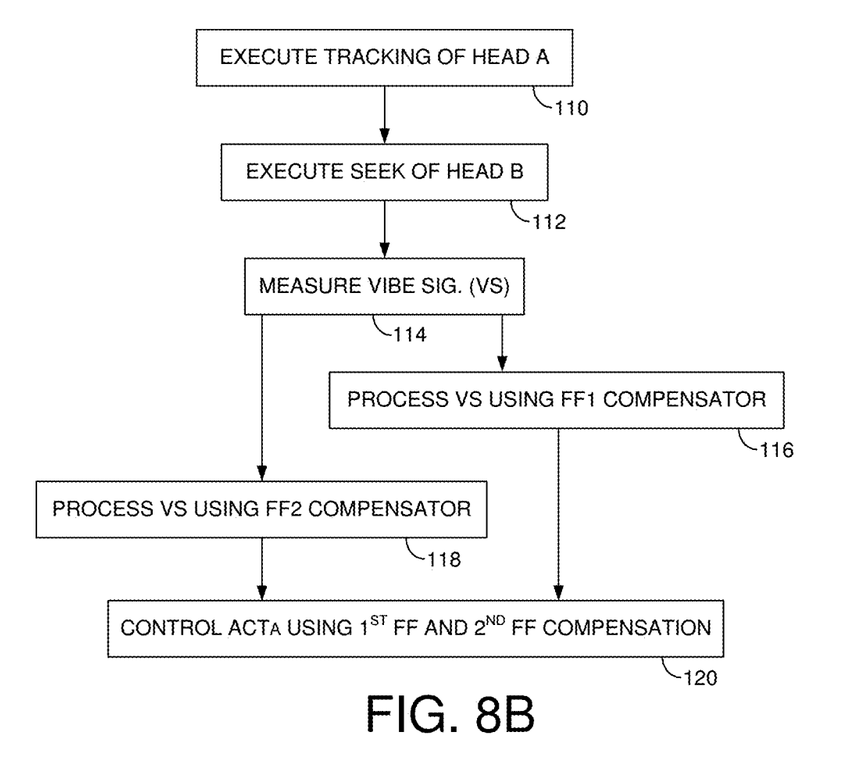
FIG. 8B is a flow diagram according to an embodiment wherein during a tracking operation of the first actuator, the preconfigured feed-forward compensator is configured to compensate for a seek vibration caused by seeking the second actuator.

FIG. 8B is a flow diagram according to an embodiment wherein while executing a tracking operation of a first head using a first actuator (block 110), a seek operation is executed to seek a second head using a second actuator (block 112) which induces a vibration into the servo control system of the first actuator. The vibration sensor 22 senses the vibration and generates a vibration signal (VS) measured at block 114. The VS is processed by a preconfigured feed-forward compensator (block 116) and by an adaptive feed-forward compensator (block 118) as described above in order to compensate for the seek vibration (block 120). In one embodiment, the preconfigured feed-forward compensator 80 for the first (tracking) actuator may be configured prior to the seek operation based on the seek length of the second (seeking) actuator similar to the embodiment described above with reference to FIG. 6. That is in one embodiment, the transfer function for the preconfigured feed-forward compensator 80 may be calibrated over a number of different seek lengths of a remote actuator similar to the flow diagram of FIG. 7A.

Figure 8C:
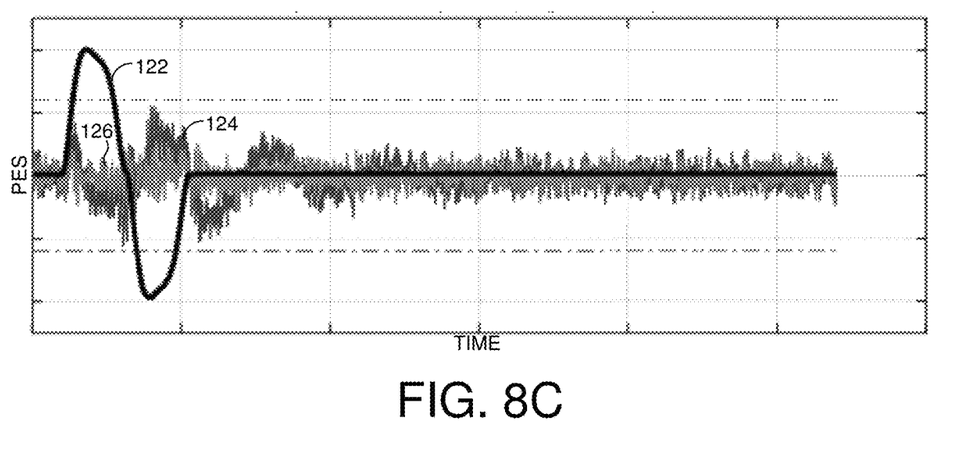
FIG. 8C shows the tracking PES of the first actuator and the effect of seeking the second actuator without and with the preconfigured feed-forward compensator according to an embodiment.

FIG. 8C shows an example of the effect on a first tracking actuator due to a seek vibration when concurrently seeking a second actuator. In the example of FIG. 8C, waveform 122 represents the control signal (e.g., driving current) applied to the seeking actuator and waveform 124 represents the disturbance effect on the PES of the tracking actuator without the use of the preconfigured feed-forward compensator 80. Waveform 126 represents the PES of the tracking actuator when using the preconfigured feed-forward compensator 80 which shows a significant reduction in the variance of the PES. In addition, FIG. 8C illustrates the near instant compensation of the seek vibration due to the preconfigured feed-forward compensator 80 (i.e., the convergence delay of the adaptive feed-forward compensator is avoided). In one embodiment, a propagating effect of the seek vibration may also be compensated by the preconfigured feed-forward compensator 80 as shown in FIG. 8C. That is even when the seek vibration subsides as shown in FIG. 8C, there may be a propagating effect on the PES that may be compensated by the preconfigured feed-forward compensator 80 (e.g., due to an infinite impulse response of its transfer function).

Figure 9A:
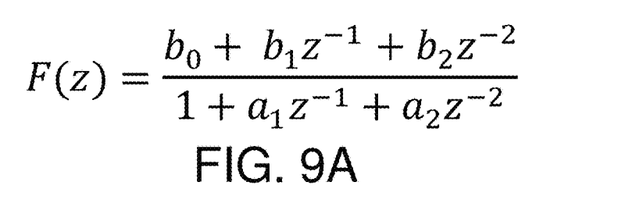
FIG. 9A shows an embodiment wherein the preconfigured feed-forward compensator comprises an infinite impulse response (IIR) filter.
Figure 9B:
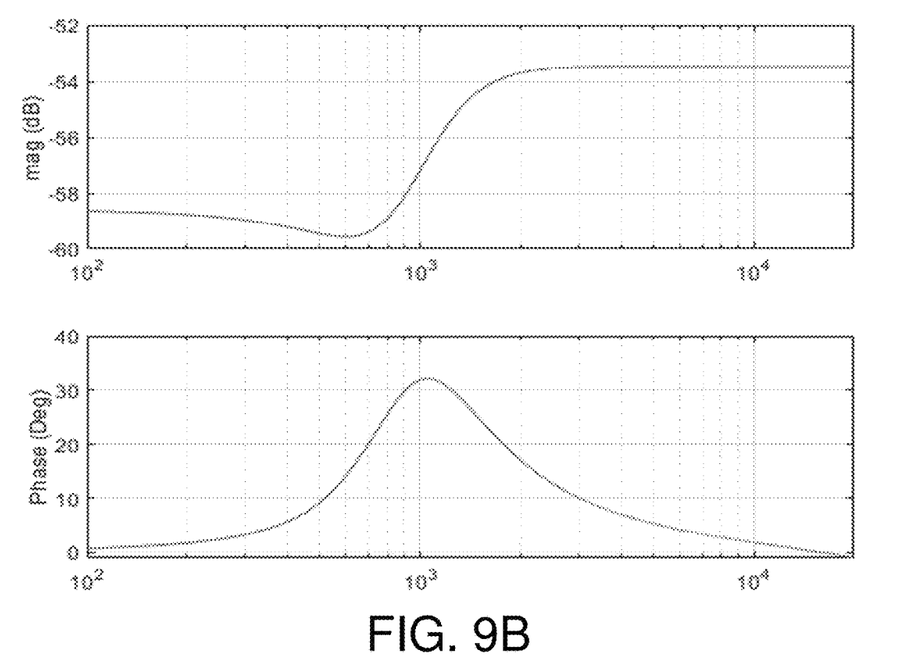
FIG. 9B shows a frequency and phase response of the IIR filter according to an embodiment.

In one embodiment, the preconfigured feed-forward compensator 80 comprises an infinite impulse response (IIR) filter having a configurable transfer function such as shown in FIG. 9A. In one embodiment, a target transfer function of the IIR filter is generated based on the PES, VS, and TRC as described above, and the coefficients {a,b} of the IIR filter are configured to substantially match the target transfer function. In one embodiment, any mismatch remaining between the transfer function of the IIR filter and the target transfer function may be compensated using the adaptive feed-forward compensator 84. FIG. 9B shows an example magnitude and phase response of a transfer function of the IIR filter wherein in this embodiment the transfer function provides a phase lead effect together with a corresponding gain to achieve the desired feed-forward compensation in the frequency range where the seek vibration manifests.

In one embodiment, the transfer function of the IIR filter is generated based on the measured PES and VS during calibration seeks as described above in order to achieve the desired phase response such as shown in FIG. 9B. Having generated the desired phase response, in one embodiment the gain of the IIR filter may be further adjusted during additional calibration seeks or during normal operation seeks while in the field based on the measured PES. For example, in one embodiment the gain of the IIR filter may be stepped through a range of values during calibration seeks, and then the gain selected that minimizes a variance of the measured PES. In another embodiment, the measured PES may be saved during a normal seek operation and the gain of the IIR filter may be adjusted based on the measured PES (e.g., by step increasing or decreasing the gain after each normal seek operation until a variance of the PES reaches a minimum). Referring again to FIG. 6, in one embodiment the gain may be calibrated by performing calibration seeks and/or adjusted during normal seek operations based on different seek lengths, and the IIR filter preconfigured with the target transfer function and gain that corresponds to the seek length of a normal, in-the-field seek operation (e.g., short seek, medium seek, or long seek).

In an embodiment that employs multiple actuators such as shown in FIG. 8A, a seek vibration from seeking a first actuator that impacts the tracking performance of a second actuator may be further compensated by processing the control signal applied to the seeking actuator in addition to processing the output of a vibration sensor 22 using a preconfigured feed-forward compensator 80 as described above. An example of generating feed-forward compensation based on the control signal applied to a seeking actuator is disclosed in U.S. Pat. No. 10,410,657 entitled "DATA STORAGE DEVICE EMPLOYING NOMINAL AND ADAPTIVE MULTI-ACTUATOR DECOUPLER," the disclosure of which is incorporated herein by reference.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk surface;
a head;
an actuator configured to actuate the head over the disk surface;
a vibration sensor configured to generate a vibration signal (VS); and
control circuitry comprising a servo control system having a torque rejection curve (TRC) configured to control the actuator, wherein the control circuitry is configured to:
measure a position error signal (PES) of the head;
measure the VS output by the vibration sensor;
configure a feed-forward compensator based on: PES/VS/TRC;
seek the head across the disk surface;
process the VS using the feed-forward compensator to generate a feed-forward compensation during a settle interval of the seek; and
control the actuator using the feed-forward compensation during the settle interval.

2. The data storage device as recited in claim 1, wherein the feed-forward compensation reduces the settle interval when seeking the head over the disk surface.

3. The data storage device as recited in claim 1, wherein prior to seeking the head a first seek length, the control circuitry is further configured to configure the feed-forward compensator based on the first seek length.

4. The data storage device as recited in claim 1, wherein the feed-forward compensator comprises a filter.

5. The data storage device as recited in claim 4, wherein the filter comprises an infinite impulse response (IIR) filter.

6. The data storage device as recited in claim 4, wherein the control circuitry is further configured to adjust a gain of the filter based on the PES of the head.

7. The data storage device as recited in claim 1, wherein:
the vibration sensor generates a rotational VS and a linear VS; and
the VS consists of the rotational VS.

8. A data storage device comprising:
a first disk surface comprising a plurality of tracks;
a first head;
a second disk surface comprising a plurality of tracks;
a second head;
a first actuator configured to actuate the first head over the first disk surface;
a second actuator configured to actuate the second head over the second disk surface;
a vibration sensor configured to generate a vibration signal (VS); and control circuitry comprising a servo control system having a torque rejection curve (TRC) configured to control the actuator, wherein the control circuitry is configured to:
- measure a position error signal (PES) of the first head;
- measure the VS output by the vibration sensor;
- configure a first feed-forward compensator based on: PES/VS/TRC;
- process the VS using the first feed-forward compensator to generate a first feed-forward compensation that compensates for a seek vibration when seeking the second actuator; and
- control the first actuator using the first feed-forward compensation.

9. The data storage device as recited in claim 8, wherein the control circuitry is further configured to:
- adapt a second feed-forward compensator based on the PES and the VS;
- process the VS using the second feed-forward compensator to generate a second feed-forward compensation; and
- control the first actuator using the first feed-forward compensation and the second feed-forward compensation.

10. The data storage device as recited in claim 8, wherein the vibration sensor comprises a first accelerometer.

11. The data storage device as recited in claim 10, wherein:
- the vibration sensor further comprises a second accelerometer; and
- the vibration sensor generates the vibration signal based on a difference between an output of the first accelerometer and an output of the second accelerometer.

12. The data storage device as recited in claim 8, wherein prior to seeking the second head a first seek length, the control circuitry is further configured to configure the first feed-forward compensator based on the first seek length.

13. The data storage device as recited in claim 8, wherein the first feed-forward compensator comprises a filter.

14. The data storage device as recited in claim 13, wherein the filter comprises an infinite impulse response (IIR) filter.

15. The data storage device as recited in claim 13, wherein the control circuitry is further configured to adjust a gain of the filter based on the PES of the first head.

* * * * *